United States Patent Office 3,111,391
Patented Nov. 19, 1963

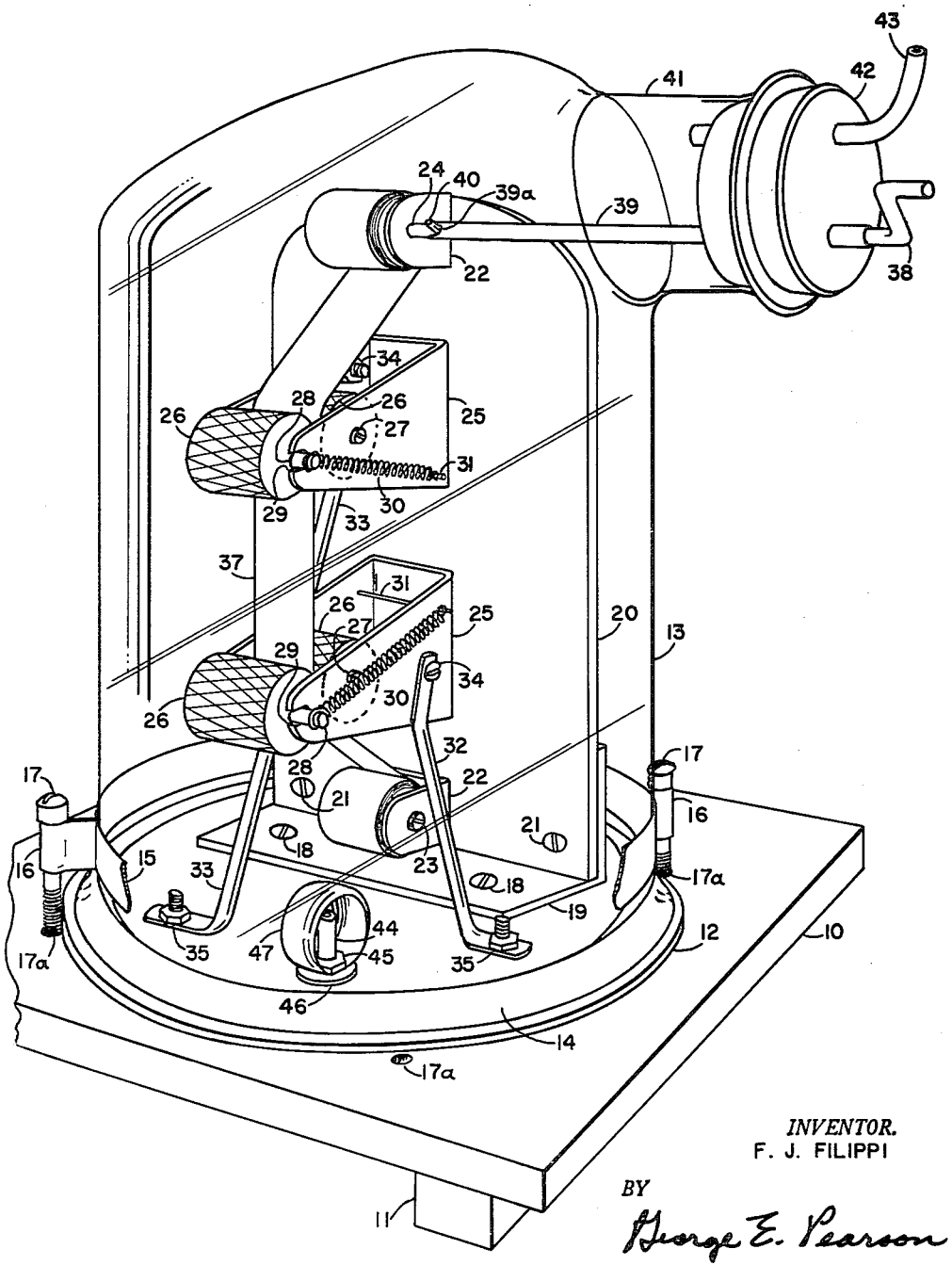

3,111,391
PROTECTIVE ATMOSPHERE PURITY TESTER
Frank J. Filippi, La Mesa, Calif., assignor to Rohr Corporation, a corporation of California
Filed Apr. 9, 1962, Ser. No. 186,238
6 Claims. (Cl. 23—254)

The present invention relates generally to the qualitative purity measurement of protective atmospheres such as inert argon gas and more particularly to a new and improved method and apparatus for measuring the quality of such an atmosphere by visually indicating the discoloration of a strip of material which has been heated therein.

In the brazing of alloys such as the stainless steels and in the welding of metals such as zirconium it is customary to use a protective atmosphere such as inert argon gas, it being known, for example, that neither oxygen nor hydrogen can be allowed to contaminate a zirconium weld. The success of the weld or brazed joint, as the case may be, thus depends to a large extent upon the purity of the atmosphere in which these operations take place. Such contaminants as water vapor, hydrogen, oxygen, sulfur, sulfates, carbonates, and other contaminants in the protective atmosphere attack and discolor the metals being processed therein and must be removed. This usually involves use of a purification system as in the purifying of argon wherein the gas passes through a dryer to remove moisture and then through a heated getter to remove "tramp" gases such as hydrogen, nitrogen, and oxygen.

It is customary to use conventional dewpoint equipment for the qualitative measurement of the water vapor content of the gas under test. The dewpoint test, however, is not sufficient by itself since it gives a measure only of the moisture present in the gas. Overall gas purity tests by visual observation of the discoloration of heated tests specimens such as may be in the form of specially shaped and treated metal test elements are known and used and are generally found to be more reliable than dewpoint equipment since they detect gaseous impurities in addition to moisture.

The principle of operation of the visual purity detectors aforementioned is well known and simple. A heated strip of material in an atmosphere will discolor in proportion to the temperature, time at temperature, and impurities in the atmosphere. The degree of discoloration will also vary with the flow rate of the gas and also with the type of material selected. Some materials such as René 41 are very sensitive to attack and discoloration by impurities present in the gaseous atmosphere. This material would discolor appreciably, for example, in an argon atmosphere having impurities of the order of 90 to 100 parts per million. Such material, therefore, might be used to check impurity limits of the order of five parts per million. Other materials containing titanium, aluminum, and similarly reactive metals, will also be sensitive to discoloration and attack to a more or less degree. Mild steel, on the other hand, is much less sensitive and would be used to provide quality measurements where the purity requirements are much less severe.

In the use of a visual detector, it is necessary to determine the purity limits of a given material to be welded or brazed, and a test material having a coloration sensitivity compatible with these limits is selected. Thus, when a high order of purity is required, a test material such as the aforementioned René 41 would be used. On the other hand, at the other extreme, a test material of mild steel, or like mildly reactive material, would be used when the metal or alloy to be brazed or welded is only moderately sensitive to the presence of contaminants in the protective atmosphere. The selected material is then heated, usually electrically as by passing current therethrough, while the same is disposed within a leak-tight enclosure which suitably contains the atmosphere to be tested without introducing contamination thereinto. After heating in this manner, the strip is cooled and then compared with a standard strip which is known to be satisfactory on the basis of predetermined tests. The comparative tests with the standard are thus on a go—no go basis.

In accordance with the method and apparatus of the present invention, provision is made for conducting successive visual discoloration tests on a given material without requiring that the atmosphere system be opened for removal of the test elements. This is accomplished by the use of an elongated strip of test material in the form of a supply roll which is mounted within the atmosphere enclosure and fed past spaced electric contact points to a takeup reel. The takeup reel has operative connections to a crank exposed externally of the atmospere enclosure which is thus operable to wind the reel and draw successive lengths of the test material between the contact points. Current is applied between these points thereby to electrically heat the strip between the points. The material may thus be repeatedly tested until the strip is exhausted.

An object of the present invention is to provide a new and improved method and apparatus for the qualitative measurement of the purity of a protective atmosphere and wherein the quality of the atmosphere is indicated visually by the discoloration of a test material heated therein.

Another object is to provide a protective atmosphere purity test method and apparatus of this type having provision for heating successive samples of a test material within the atmosphere under test without opening the atmosphere enclosure or withdrawing the samples therefrom.

Another object is to provide a visual discoloration purity tester having provision for drawing successive lengths of a test strip material between contact points for electrical heating of the same within the atmosphere under test.

Still another object in a tester of this type is to provide for manipulation of the strip externally of the atmosphere enclosure to draw successive lengths of the strip between the contact points.

Still other objects, features and advantages of the present invention will become more fully apparent as the description proceeds, reference being had to the single FIGURE of the drawing which discloses, in perspective, a discoloration purity tester constructed in accordance with the best mode thus far devised for practicing the principles of the invention.

Referring now to the drawing, it will be seen that the tester comprises a suitable base 10 having spaced supports 11, only one of which is shown. As will more fully appear as the description proceeds, certain elements of the apparatus extend beneath the base for connection with associated equipment, and the base thus preferably is suitably elevated somewhat as by provision of the leg supports 11. A circular sheet 12 of low gas permeability resilient material, such as polyethylene, is disposed on the base 10 and serves to seal the open end of a flask or enclosure 13. Flask 13 may generally be of any suitable configuration and formed of any suitable transparent material such as glass, the requirement of the flask generally being to provide with the resilient sheet 12 a leak-tight enclosure suitable for containing therewithin the atmosphere to be tested without contributing to the contamination thereof. To this end, the flask 13 as disclosed, is in the form of a Pyrex "Drainline" (glass pipeline) reducer which thus also provides for the visual observation of materials under test and of the parts enclosed within the flask 13.

Flask 13 has a lip 14 which, on its inner surface, engages the sheet 12 and on its outer surface is engaged by a ring or endless band 15 which encircles the flask and engages the lip so as to be capable of urging the same yieldably against the resilient sheet 12. To this end, ring 15 has radial extensions 16 which, in turn, receive screws 17. Threaded openings 17 are provided in the base 10 to receive the screws 17 which may thus be tightened to urge the flask yieldably into sealing engagement with the resilient sheet 12, as aforementioned.

Turning now to the structure enclosed within the flask, it will be seen that a pair of screws 18 are employed to secure an angle member 19 to the base 10. This angle member, in turn, serves to support a vertically disposed mounting plate 20 to which it is secured as by screws 21. Plate 20 is formed of any suitably strong and electrically insulative material such, for example, as Transite. Secured near the top and bottom respectively of plate 20, is a pair of U-shaped brackets 22 which may be secured to the plate in any suitable manner, as by screws (not shown). The legs of the lower bracket 22 serve to journal screws 23 which, in turn, rotatively support the supply roll of the material under test. In like manner, the upper bracket 22 provides journal supports for a shaft 24 which provides a takeup reel for the test material wound thereabout and drawn from the supply roll of the material, all in a manner more fully to be described as the description proceeds.

A second pair of somewhat larger U-shaped brackets 25 are mounted on plate 20 and spaced thereon between the brackets 22 and in spaced relation with respect to each other. These brackets are generally identical and serve as opposed electrodes, being thus necessarily separated electrically from each other by reason of their spaced mounting on the electrically insulative material of the mounting plate 20. Each bracket 25 has a pair of mutually confronting electrode rollers 26, the inner one of which has its axis of rotation fixed as by the journal screws 27. The outer roller carries stub shafts 28 (only one appears) which, are slidably and rotatably received within slots 29 respectively provided within the ends of the legs of bracket 25. A rod 31 passes through each bracket 25 near the base thereof, and each projecting end of rod 31 serves to engage one end of a spring 30, the other end of which is engaged by a stub shaft 28 to thus yieldably urge the outer electrode roller 26 toward the inner roller.

Lower and upper electrode brackets 25 respectively have a pair of conductor lead straps 32 and 33 suitably secured electrically thereto as by the screw faseners 34. The other end of these conductor leads are secured as by nut and bolt fasteners 35 to the base 10, and these fasteners on the under side of the base also serve as terminals for the connection thereto of a suitable source of current such, for example, as a transformer (not shown).

The electrode brackets 25, the electrode rollers 26, shafts 27 and 28, and the conductor leads 32 and 33 preferably all are formed of a highly electrically conductive material such as copper. In addition, the rollers 26 preferably have their peripheral surfaces scored, knurled, or suitably upset, as schematically disclosed, in order the better to make good electrical contact with the strip material which is drawn therebetween to the end that the length or portion 37 of the strip material which extends between the upper and lower rollers 26 effectively completes a circuit therebetween.

In order to draw successive lengths of the test material between the upper and lower electrode rollers 26, means is provided which is operable externally of the flask 13 for driving the takeup reel shaft 24. This means, as disclosed, comprises a crank 38 which is secured to a rod 39, this rod is recessed at its end as at 39a to receive a pin 40 carried by shaft 24 of the takeup reel. The flask 13 has a neck 41 which is closed by a stopper 42 through which a gas outlet tube 43 extends. Rod 39 also suitably extends through the stopper 42 and is thus withdrawn from the flask when the stopper 42 is removed from the neck 41. When this occurs, slot 39a simply withdraws from its engagement with the pin 40 to thus break the driving connection between rod 39 and the shaft. The rod 39 may thus simply be made to engage shaft 24 and establish a driving connection therewith upon inserting the stopper 42 to seal the flask, and the crank 38 may be manipulated to operate the takeup reel without breaking into the enclosure once it has become sealed. On the other hand, once the supply of material has been fully wound up on the takeup reel, or when it is desired to change the test material, or otherwise get to the enclosed apparatus, it becomes necessary only to withdraw the stopper to break the driving connection to the takeup reel, as aforedescribed. The flask 13 may then be readily withdrawn from the base 10.

The atmosphere to be tested is preferably introduced into the flask from beneath the base 10 for heavier-than-air gases and, for this purpose, a tube 44 originates beneath the base and extends upwardly therethrough, and through the resilient sheet 12, to a position just above the base for heavier-than-air gases, as disclosed. A portion of the tube preferably is threaded to receive a nut 45 which thus serves to clamp a washer 46 in sealing engagement with the resilient sheet 12 and to also clamp a diffusion ring 47 by means of which the heavier gas entering the flask by way of tube 44 is generally caused initially to be directed horizontally within the flask and along the sheet 12 from whence it naturally rises, being supplied slightly in excess of atmospheric pressure. The incoming gas thus is effective to displace the air outwardly of the flask via the tube 43 until the protective atmosphere itself escapes by way of this outlet. Lighter-than-air gases are passed through the flask 13 in the reverse direction. Lighter-than-air gases are introduced through the outlet tube 43 and, after displacing the heavier air, are exhausted through tube 44.

In the use of the visual discoloration detector hereinbefore disclosed, let it be assumed first that the flask 13 is removed from the base 10. It then becomes a simple matter to insert a supply roll of material to be tested within lower bracket 22 and upon rotative support 23. The free end of the rolled material is then inserted between the lower pair of electrode rollers 26, the front roller 26 being retracted against the biasing action of springs 30, as required, to facilitate the feeding of the strip between the rolls. The strip is then continued upwardly and between the upper pair of electrode rollers 26, and thereafter extended to and secured in any suitable manner (not shown) to the shaft 24. It will be understood that the test strip may be secured to a roller or reel, in turn, secured to the shaft for rotation therewith. The flask 13 is then mounted in position on the resilient sheet 12 and the screws 17 tightened to seal the flask to the base. The stopper 42 is next inserted into the neck 41 and simultaneously rod 39 is moved on to shaft 24 until the slot 39a engages and forms a driving connection with the pin 40 on the shaft. The apparatus is then ready for the test.

A protective atmosphere such as argon which may be used, by way of example, to provide a protective atmosphere in the welding of Zircaloy-2 pipe is then admitted into the enclosure afforded by flask 13 by way of the inlet tube 44, thereby ultimately to fill the enclosure with the protective atmosphere.

Considering the assumed example of the welding of the Zircaloy-2 pipe, this pipe or tubing is used in the manufacture of nuclear reactor tubes for which use the material is well qualified. Zircaloy-2 is the tradename for a zirconium alloy which is a metal requiring special handling in each step of the processing of the same. As aforementioned, it cannot be welded in a normal atmosphere, but requires a protective inert atmosphere such as afforded by argon gas having a very high degree of purity. For this reason, a discoloration sensitive material such as AISI 321 stainless steel is used as the test strip to provide a quality measurement of the argon used.

In the assumed example, a welding system is employed wherein each weld of the Zircaloy tube assembly is made in a sealed chamber to which the welder has access through sealed gloves. The protective atmosphere is supplied to the pipe and chamber. Piping and valves to the tester, disposed, beneath the base 10 (not shown), enable rapid testing of the argon gas from the source, the welding chamber, and the Zircaloy pipe interior, and the capacity of the tester to provide successive strip samples 37 for test thus expedites and facilitates the purification process.

In each test, current is passed between the spaced electrode rollers 26 thereby to heat test strip portion 37 therebetween. It will be understood that the mount and duration of the current used in each case, that is for each test strip used, will depend upon the material of the strip, its resistivity, width, thickness, discoloration sensitivity, and other factors. After cooling, the degree of discoloration of the strip portion 37 is viewed comparatively with a standard test element of the same material which has previously been heated in the presence of an argon atmosphere of the required purity for the metal being processed, this in the assumed case being the Zircaloy-2 tubing. The Pyrex flask 13 makes viewing of the heated strip portion 37 possible and convenient from almost any viewing point externally of the flask. Thus, it may be viewed as shown in the position between the electrodes or the strip may be advanced by manipulation of crank 38 to position the strip test portion between the upper electrodes 26 and the takeup reel assembly. It will be understood, moreover, that use of a glass, or the like transparent flask 13, is not essential for the purposes of the invention, it being only necessary that the enclosure 13 provide a leak-tight contamination free container for the atmosphere under test, access means for manipulation of the test strip externally of the flask, and at least one window for viewing the test strip portion.

From the foregoing, it should now be apparent that there has been provided an invention residing in a new and improved discoloration method and process for the qualitative measurement of a protective atmosphere which is well adapted to fulfill the aforestated objects of the invention. It will be understood, moreover, that this invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim is new and useful and desire to secure by Letters Patent is:

1. Apparatus for the qualitative measurement of the purity of a protective atmosphere comprising, in combination, a leak-tight enclosure for containing the protective atmosphere to be tested, a roll of an elongated strip of test material having predetermined discoloration sensitivity relative to purity limits of the atmosphere to be tested, means disposed and mounted within said enclosure and comprising a supply reel for said roll of test material, means disposed within said enclosure and comprising a takeup reel for said test strip, spaced electrodes disposed between said supply and takeup reels and electrically engaged movably with said test strip to define a succession of test strip portions between the electrodes as the test strip is moved from the supply reel to the take up reel, means coupled to said takeup reel and operable externally of said enclosure for drawing said test strip from said supply reel and transferring said test portions of said test strip between said supply and takeup reel, and means connecting said electrodes across a source of electrical potential disposed externally of said enclosure for discretely heating each of said test strip portions electrically by passing current from said source therethrough, said enclosure having window means for viewing the degree of discoloration imparted to each of said heated test strip portions.

2. Apparatus for the qualitative measurement of the purity of a protective atmosphere comprising, in combination, means comprising a base, enclosure means engageable with the base for providing therewith a leak-tight enclosure for containing a protective atmosphere to be tested, a mounting plate disposed within said enclosure and supported on said base, a pair of spaced electrodes mounted on said plate and insulated electrically from each other, a supply roll of an elongated strip of test material having predetermined discoloration sensitivity with respect to purity limits of the protective atmosphere under test, means mounted on said plate and comprising a supply reel for said roll of test material, said supply reel being positioned for withdrawal of said test strip therefrom and over said spaced electrodes, means mounted on said plate and comprising a takeup reel for said strip of test material, said takeup reel being positioned to receive and takeup said test strip as the same is drawn from said spaced electrodes, means operatively connected to said takeup reel and including an element operable externally of said enclosure to rotate said takeup reel and draw said test strip over the spaced electrodes and means electrically connecting said electrodes for connecting the same across a source of potential disposed externally of said enclosure thereby to pass current through the test strip portion disposed between said spaced electrodes to electrically heat the same, said enclosure having means for viewing the degree of discoloration of said test strip portion responsive to said heating of the same.

3. Apparatus as in claim 2 wherein said rotating means for said takeup reel comprises separable driving connections connecting the same with said external element whereby said driving connections may be separated and withdrawn from said enclosure to facilitate withdrawal of the enclosure from said base.

4. Apparatus as in claim 2 wherein each of said electrodes comprises a pair of confronting electrode rollers for passage of said strip material therebetween.

5. Apparatus as in claim 4, one of said rollers having a fixed axis of rotation, the other of said rollers having means for rotatively supporting the same and for displacing its axis of rotation away from said fixed axis of rotation of said one of the rollers, and means for yieldably urging said rollers together thereby yieldably engaging said strip of test material therebetween.

6. Apparatus as in claim 2 and further comprising inlet means for admitting said protective atmosphere under test into said enclosure from beneath said base and outlet means for permitting escape of said protective atmosphere from a point at or near the top of said enclosure, said inlet means having means for diffusing the admitted atmosphere parallel to said base.

References Cited in the file of this patent

UNITED STATES PATENTS

| | | |
|---|---|---|
| 2,049,947 | Cope | Aug. 4, 1936 |
| 2,279,231 | Gier | Apr. 7, 1942 |
| 2,283,798 | Delano | May 19, 1942 |
| 3,009,785 | Kaarlela | Nov. 21, 1961 |
| 3,016,237 | Caron et al. | Jan. 9, 1962 |